UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

SOUND-RECORD.

1,255,500.  Specification of Letters Patent.  Patented Feb. 5, 1918.

No Drawing. Original application filed February 11, 1910, Serial No. 543,236. Divided and this application filed May 24, 1915. Serial No. 30,197.

*To all whom it may concern:*

Be it known that I, JONAS W. AYLSWORTH, a citizen of the United States, and a resident of East Orange, in the county of Essex and State of New Jersey, have invented certain new and useful Improvements in Sound-Records, of which the following is a description.

My invention relates to sound records formed of refractory condensation products, this application being a division of my copending application Serial No. 543,236, which has matured into United States Patent No. 1,146,388, dated July 13, 1915, this application being also a continuation in part of my copending application Serial No. 499,103, which has matured into United States Patent No. 1,146,386, dated July 13, 1915, as to the matter common to this application and said application Serial No. 499,103.

My object is to produce records of improved quality, life, and other valuable characteristics from substances of the class described.

The materials from which I manufacture the sound records are in their final state non-fusible, insoluble and difficult to mold by processes requiring the material to be cast or pressed while in a plastic state. The materials referred to are condensation products of phenol or equivalent substances, and formaldehyde or other material containing active methylene groups. It has been proposed to carry the reaction of such substances to an intermediate state only and to harden the same in a mold in which they are shaped to the final, refractory and infusible condition. The hardening reaction of such intermediate phenolic condensation products and other condensation reactions of similar character require a considerable time even when a relatively high temperature is employed, resulting in the necessity of employing expensive matrices in large numbers in order that the required output of a given sound record may be obtained, and which accordingly, curtails the number of facsimiles which may be made from each matrix per diem.

My invention greatly increases the number of records which may be made from each matrix per day, and also obviates another objectionable feature incident to the manufacture of sound records molded from condensation products wherein the reaction is caused to culminate entirely or in part, while the product is inclosed in the matrix under the influence of heat and pressure, which consists in the entrapping of by-products of the reaction within the intermolecular spaces of the product. These by-products may consist of water vapor, vapor of ammonia, excess of formaldehyde or other material containing the methylene radical, etc., according to the specific character of the composition employed. These gaseous products even though they may be small in amount, impair the surface of the record to an extent causing a phonetic roughness, and otherwise impair the quality of a high grade record.

My invention relates specifically to disk records of either the vertical or transverse groove type, although it is obvious that the same methods may be used in connection with the cylindrical type of record. My invention comprises broadly a sound record as a new article of manufacture composed of the ingredients hereinafter to be described, which record may broadly be of either the disk or cylindrical type; my invention also comprises specifically a disk sound record formed in the manner and by the specific process to be described.

The process of manufacturing disk records involves four principal steps or operations. The first step consists in the preparation of the composition in such a manner that the components thereof may react chemically or harden to form a hard infusible product when subsequently heated to the proper reacting temperature. The second step consists in heating the composition to the desired form in a blank mold heated only sufficiently to render the composition plastic, so that it may be compressed to fill the mold and weld the mass to a solid unit of the desired shape. This blank has not so far been given its final hardening. The third step consists in removing the blank so formed from the mold, heating it in a suitable receptacle for the purpose of hardening or completing the reaction, and permitting the by-products of the reaction to evaporate or escape from the blank. The fourth step consists in pressing the hardened blank in a hot matrix to form the desired sound record. The material which I use for forming blanks and subsequently records therefrom, is of such a character that in its final condition it is refractory, infusible, and insoluble, but is rendered sufficiently plastic by application of a suitable amount of heat to take a perfect impression from the mold. Final condensation products of phenol and formaldehyde or other methylene-containing agents can usually not be rendered sufficiently plastic by the action of heat to take an impression from a mold or die, but my improved composition has this characteristic because of the inclusion therein of an element of the class which I denote as final product solvent elements, as disclosed in my United States Patent No. 1,102,630, dated July 7, 1914.

It may be well to state that it is now well known that phenolic bodies may be caused to react when combined with formaldehyde or polymers thereof to form condensation products of various degrees of hardness and infusibility. One type of these products are fusible resinous products which are known by the general name of shellac substitutes. These are soluble in various solvents, may be melted, and are suitable generally for use as substitutes for shellac and similar uses. The other type of reaction products referred to is a hard infusible insoluble amorphous mass which is chemically inert. A great practical difficulty in the use of the last named product has been that when the reaction has been carried on at sufficiently high temperatures and with sufficient energy to enable the product to be formed within a reasonably short time, gases of dissociation of formaldehyde or the like have been evolved, together with water vapors, which have rendered the mass porous and consequently unfit for most industrial applications. It has been proposed to hasten the reaction by the use of catalytic or so-called condensing agents in small quantity, which, however, leave objectionable components in the mass or traces thereof, result in the evolution of gas, and aid in the setting up of internal stresses within the substance, which render it brittle and distorted and shorten the life and usefulness of the product. It has also been proposed to perform the final reaction in such substances under counteracting pressure, which prevents in large measure, the formation of objectionable bubbles and porosity, this process being similar to the well known method of vulcanizing rubber and the employment of pressure in the manufacture of other industrial compositions. The use of such pressure results in the entrapping of water vapors and other gases within the substance in the manner described in my United States Patent No. 1,020,593, dated March 19, 1912. This result necessarily takes place if the counteracting pressure is greater than the pressure of the water vapor or other gases, as it must be to prevent the escape of such gases during the reaction. In my United States Patent No. 1,102,630 above referred to, I describe a final phenolic condensation product and a method of preparing the same in which catalytic agents are not required, and in which the use of a counteracting pressure during the final reaction is not necessary. This result is attained by the formation, first, of a final or permanently fusible primary reaction product in which the formaldehyde or methylene-containing element is all combined with the phenol, and the phenol is all or practically all combined with the aldehyde. A hardening reaction is then caused to take place between this product and formaldehyde or a polymer thereof in quantity just sufficient to combine with all of the fusible condensation product to form the final hard condensation product, the methylene-containing or hardening ingredient being used in relatively small quantities and the heat of the reaction being regulated to prevent the escape of formaldehyde gas during the reaction. It was my discovery that formaldehyde or other methylene-containing agent and a phenolic body may be combined and caused to react in such proportions that the fusible condensation product referred to is formed, and this substance may then be combined with a further amount of formaldehyde or other methylene-containing ingredient to form the final condensation product. The proportions required for the formation of the fusible product referred to in order to get the best results are three parts of phenol to two parts of formaldehyde by molecular weight. This apparently causes the chemical reaction

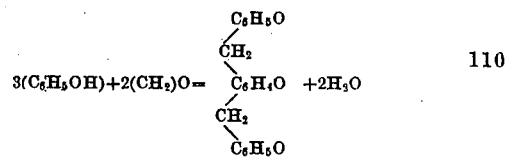

The final hardening reaction when paraform or other anhydrous form of formaldehyde is used apparently causes the chemical reaction

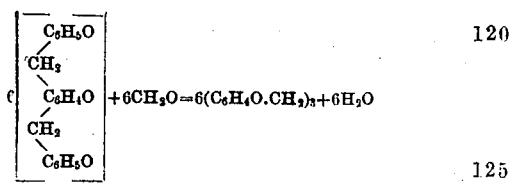

when the paraform is used in suitable quantity. When hexa-methylene-tetra-amin is used in place of the paraform, as described in United States Patent No. 1,020,593 above referred to, the chemical reaction apparently is

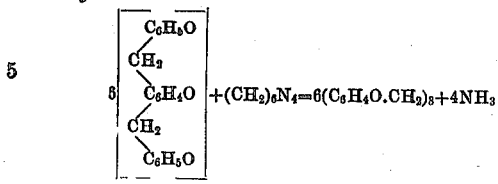

The product formed by either reaction hardens on the application of a suitable amount of heat to an infusible refractory resinous amorphous mass of a pale amber color when the reacting substances are pure. Subsequent to the date of my invention embodied in U. S. Patent No. 1,102,630 above referred to, I discovered that a substance containing a methylene radical other than the oxid or hydroxid and preferably hexa-methylene-amin or hexa-methylene-tetra-amin, as it is sometimes called $(CH_2)_6N_4$, or other methylene-amin compound, might be substituted for the paraform or other aldehyde element used in the final reaction for hardening the substance with improved effect. This discovery is embodied in my United States Patent No. 1,020,593 referred to. The hexa-methylene-amin or other methylene-amin compound possesses the chief advantage over the aldehyde to perform the desired function in that it is not necessary to take great care to limit the amount of the methylene-amin to the exact proportion necessary for combining with the fusible condensation product, since gas is not evolved during the reaction if the methylene-amin is present in excess, the methylene-amin only parting with its methylene upon reaction with the fusible condensation product in exchange for hydrogen from the fusible product, which unites with the nitrogen of the methylene-amin to form ammonia. My improved phonograph record is formed from the substances described in the applications referred to and takes advantage of the discoveries therein recited.

While the use of the specific fusible product referred to is preferable, I may use various of the so-called shellac substitutes on the market for combination with the methylene-containing ingredient to form the final product with good results. So far as I know, no one prior to my discoveries above referred to, formed a final condensation phenolic product by first forming a permanently fusible product and adding thereto an ingredient which upon further heat treatment resulted in a final infusible condensation product, nor was the nature of the substances referred to accurately known. The general practice was to mix together in the first place all the ingredients necessary for the formation of the final infusible product, and to heat the same either in one or several stages to produce the final product. This resulted in the formation of a product which at all stages prior to the formation of the final product contained free or uncombined formaldehyde or methylene-containing element, which, at the heat of the main reaction tended constantly to escape as gas. Other advantages of this method of procedure over the former method referred to and of the product so formed over the products previously known of the class described, are fully set forth in my patents referred to above.

The first step noted above in the formation of my improved sound record comprises the mixing together of a completed fusible soluble condensation product, such as certain shellac substitutes of phenolic origin, or the phenol resin referred to above and fully described in my patents above referred to, together with the following substances:—A final product solvent element or plasticity component; a methylene-containing agent or substance which will yield the methylene radical in exchange for an equivalent amount of hydrogen from the phenolic resin; a suitable filling component, such as inert powdered materials of mineral or organic nature. Each of these components is present in proper proportion to form a completed product of desired color, hardness and texture, when submitted to the subsequent operations.

Examples of compositions of the class specified are the following:—

Phenol resin or equivalent shellac substitute—100 parts by weight.

Solid solvent or plasticity component such as

Meta-di-nitro-benzole  
Nitro-naphthalene  
Camphor  
Stearic amid or other solid acid amids of the acetic series  
} 10 to 20 parts Methylene yielding agent such as Hexa-methylene-amin  
Tri-oxy-methylene  
Thio-formic aldehyde  
} 7 to 11 parts Pigment such as lamp black—2 to 5 parts Mineral filling agent such as Plaster of Paris  
Barium sulfate  
Infusorial earth  
Clay, etc  
} 50 to 300 parts or as an alternative, an organic filling agent such as Powdered amber  
Wood flour  
Ivory nut dust  
Insoluble casein salts  
Infusible resinates  
Infusible condensation products in powdered form  
} 50 to 100 parts Of the above named solid solvents or plasticity components, meta-di-nitro-benzol and nitro-naphthalene are preferred because they are neither volatile nor water soluble. The equivalents of these components could, of course, also be used.

The composition may be mixed by powerful kneading machines or ground or rolled at temperatures below the reaction temperature which, for the above type of composition, is about 180 degrees F. The mixed material may be pulverized or may be formed in rough cakes suitable for compressing or consolidating in subsequent molding operations.

The second step comprises the consolidation of the powdered substances or compression of the rough cake into a suitable heated blank mold by hydraulic or other pressure and the removal of the blank from the mold, which may be accomplished without cooling when some compositions are used, while with others it is necessary to first cool the mass.

The third step comprises heating the blanks to a proper reaction temperature for a sufficient time to allow the complete hardening reaction to take place and drying out or expelling the undesirable reaction products previously mentioned. During this operation, the blank may be supported in such a manner that it will lie flat and that the reaction byproducts may escape readily. It is obvious that as much time as is required may be used in this operation, even though it takes several hours or even days, without injurious consequences, since no expensive molds are involved and caused to remain idle during this step of the process. When the blanks are hardened in finished condition, they may be stored for indefinite periods preparatory to use in the fourth step of the process, consisting in pressing the blanks to make sound records from suitable matrices, or they may be taken at once from the oven while still hot and placed in the record matrix, which is also heated to the proper temperature for rendering the particular composition used sufficiently plastic to take the impression of the sound waves from the matrix. This fourth step is carried out by means of hydraulic presses, and the matrices are cooled in the presses, this operation requiring the use of the mold but a few moments.

Records thus made have no tendency to stick to the mold, which is often the result when the final reaction is caused to take place within the mold. Furthermore, the records may be repressed if desired to make them over when obsolete. Furthermore, there is no tendency for the filling material in the composition to injure or wear the matrix or for the components of the composition to corrode the matrix when the composition is made as described in contra-distinction to similar records made when the operation is carried on by heat and pressure within the matrix.

When cylindrical sound records are to be made in accordance with my invention, the ingredients are prepared, mixed and consolidated to shape in a blank cylindrical mold, the mold being heated and pressure applied in any desirable manner to mold the blank. Preferably, the heat employed is of a temperature less than the reaction temperature of the composition. The blank is then cooled and upon shrinking sufficiently is removed from the blank mold by direct longitudinal movement thereof. It is then heated in an oven or other suitable receptacle sufficiently to permit the hardening reaction to take place and the harmful reaction by-products to escape in the manner referred to in connection with the process as applied to disk records. The blanks thus formed are pressed in a suitable cylindrical matrix to form the sound record on their outer surfaces, while the blanks are in plastic condition, the blanks either being put into the molds directly from the oven while still hot, or if they are stored for future use, they may be heated sufficiently to become plastic before being placed in the sound record matrix. The pressure may be applied upon the blanks to form the record in any suitable manner, and the records thus formed are cooled sufficiently to shrink away from the record surface, when they may be removed from the mold, or they may be removed by means of suction applied to the interior of the record or pressure applied to the outer surface of the record, or both, as disclosed in my United States Patent No. 1,036,416, dated August 20, 1912.

While I consider it preferable to form sound records and blanks by the processes described, it should be understood that my invention comprises broadly sound records and blanks formed of the substances described by any suitable process, such records being, to the best of my knowledge, novel articles of manufacture however formed. Thus, while I prefer to form sound records by the processes described, in which the record is formed upon the blank by pressing, it is possible to form records of the substances described by a casting operation, that is to say, by carrying on all the necessary reactions to form the final article within the mold itself. It also should be understood that any water vapor contained within the mass may be absorbed by a suitable percentage of a water-absorbing element, as described in my U. S. Patent No. 1,102,630, and that if a methylene-amin compound is used as a hardening agent, as described in my U. S. Patent No. 1,020,593 above referred to, the ammonia evolved may be fixed by the addition of a small percentage of an ammonia fixing agent to the mass, such as one of the anhydrids of the higher members of the acids of the acetic series, or phthalic or benzoic anhydrid, which results in the formation of an acid amid, which substance has the desirable properties of acting as a final product solvent agent or plasticity or water-combining agent, as well as an ammonia fixing agent.

The sound record formed by any of the processes described above is exceedingly hard and is exceptionally well adapted to give a sound reproduction of excellent quality when played. I have found that the yielding by elasticity of the record surface when tracked by a small reproducing stylus point is very pronounced with all of the well known hard wax or metallic soap compositions, and results in a weaker reproduction than would otherwise be the case. The volume of sound and clearness of definition on reproduction increases directly with the hardness of the record substance, as indicated by any known method of measuring hardness. Accordingly, as stated, the composition of which I now propose to form sound records, because of its exceeding hardness, gives a greatly improved reproduction.

Having now described my invention, what I claim as new and desire to protect by Letters Patent of the United States is as follows:—

1. As a new article of manufacture, a sound record or blank containing a final infusible phenolic condensation product which is sufficiently plastic when heated to be pressed or molded, and an inert filling material incorporated with said product in the proportion of at least 50 parts of filling material to 100 parts of condensation product, substantially as described.

2. As a new article of manufacture, a sound record or blank containing a final infusible phenolic condensation product which is sufficiently plastic when heated to be pressed or molded, and a fibrous filling material incorporated with said product in the proportion of at least 50 parts of filling material to 100 parts of condensation product, substantially as described.

3. As a new article of manufacture, a sound record or blank containing a final infusible phenolic condensation product which is sufficiently plastic when heated to be pressed or molded, and a filler of wood flour incorporated with said product in the proportion of at least 50 parts of filling material to 100 parts of condensation product, substantially as described.

4. As a new article of manufacture, a sound record or blank containing an infusible phenolic condensation product and a filling material incorporated therewith in the proportion of at least 50 parts of filling material to 100 parts of condensation product, substantially as described.

5. As a new article of manufacture, a sound record or blank containing an infusible phenolic condensation product and a filling material comprising wood fiber incorporated with said condensation product in the proportion of at least 50 parts of filling material to 100 parts of condensation product, substantially as described.

6. As a new article of manufacture, a sound record or blank containing an infusible phenolic condensation product and a finely divided filling material in the proportion of at least 50 parts of filling material to 100 parts of condensation product, substantially as described.

7. As a new article of manufacture, a sound record or blank containing an infusible phenolic condensation product which is sufficiently plastic when heated to be pressed or molded and a finely divided filling material in the proportion of at least 50 parts of filling material to 100 parts of condensation product, substantially as described.

8. As a new article of manufacture, a sound record or blank containing an infusible phenolic condensation product of a phenol resin and a methylene containing compound or derivative and a finely divided filling material in the proportion of at least 50 parts of filling material to 100 parts of condensation product, substantially as described.

9. As a new article of manufacture, a sound record or blank containing an infusible phenolic condensation product of a phenol resin and a methylene containing compound or derivative and containing no catalytic agents or free or combined water and a finely divided filling material in the proportion of at least 50 parts of filling material to 100 parts of condensation product, substantially as described.

This specification signed and witnessed this 21st day of May, 1915.

JONAS W. AYLSWORTH.

Witnesses:
 FREDERICK BACHMANN,
 J. UNGER.